United States Patent

Bisbis et al.

[11] Patent Number: 5,919,539
[45] Date of Patent: Jul. 6, 1999

[54] ULTRASONIC SEAMING OF SPUNBONDED POLYOLEFIN SHEET MATERIAL

[75] Inventors: Benyoussef Y. Bisbis, Echternach; Ernst Johann Hauer, Luxembourg, both of Luxembourg

[73] Assignee: E. I. du Pont de Nemours and Company, Wilmington, Del.

[21] Appl. No.: 08/599,766

[22] Filed: Feb. 12, 1996

[51] Int. Cl.[6] .................................................. B32B 3/00
[52] U.S. Cl. .................... 428/57; 2/2; 2/77; 2/79; 428/58; 428/61; 428/192; 428/903
[58] Field of Search .................. 428/57, 58, 61, 428/903, 192; 2/2, 77, 79

[56] References Cited

U.S. PATENT DOCUMENTS

| | | | |
|---|---|---|---|
| 3,169,899 | 2/1965 | Steuber | 161/72 |
| 4,670,073 | 6/1987 | Langley | 156/73.1 |
| 4,683,593 | 8/1987 | Langley | 2/82 |
| 4,938,817 | 7/1990 | Langley | 156/73.1 |
| 5,492,753 | 2/1996 | Levy | 428/219 |

FOREIGN PATENT DOCUMENTS 199 472  2/1990  European Pat. Off. .

OTHER PUBLICATIONS

Boggs, "Vibrate Your Parts Together", Design News (Aug. 2, 1993).

*Primary Examiner*—Nasser Ahmad

[57] ABSTRACT

A method for ultrasonically joining flashspun bonded polyolefin sheets and a seam generated by the method is provided. The method includes the steps of overlapping at least two polyolefin sheet edges, and connecting the overlapped edges by feeding the overlapped portions between an ultrasonic horn and a patterned backup roll. The connected first and second sheet edge portions have a tensile strength across the overlapped and welded portion that is at least 75% of the tensile strength of the sheet material joined. The seam is generated with just one pass between the ultrasonic horn and the patterned backup roll.

6 Claims, 2 Drawing Sheets

ULTRASONIC SEAMING OF SPUNBONDED POLYOLEFIN SHEET MATERIAL

FIELD OF THE INVENTION

This invention relates to a novel method for seaming spunbonded polyolefin sheet material and to the manufacture of garments made from such sheet material.

BACKGROUND OF THE INVENTION

Spunbonded polyolefin sheet materials are used in a variety of applications, including protective vehicle covers, chemical and biological protective clothing, and industrial cleanroom coveralls. In the aforementioned applications, panels of spunbonded polyolefin sheet material must be joined. Such panels are conventionally joined by sewing, heat welding, adhesive bonding, or ultrasonic welding. In certain applications, the seams that join the panels of sheet material together must be nearly as strong, as moisture and particulate impermeable, and as flexible as the sheet material itself.

A polyolefin sheet material that is used in many protective garments is TYVEK® spunbonded polyolefin sheet sold by E. I. du Pont de Nemours and Company of Wilmington, Del. (hereinafter "DuPont". TYVEK® is a registered trademark of DuPont. TYVEK® sheets are made from flashspun polyethylene plexifilamentary fibers that have been thermally bonded as disclosed in U.S. Pat. No. 3,169,899 issued to Steuber. TYVEK® (sheet material is especially useful in protective garment applications because it is both strong and lightweight, and because it is substantially impermeable to particulates and liquids.

In making protective garments from panels of spunbonded polyolefin sheet material, it has proved difficult to join the panels in a manner that does not compromise the effectiveness of the garment. When garments are sewn from panels of spunbonded polyolefin, needle holes make the garments too porous for many protective applications. Likewise, the needle holes that result from the stitching of seams can emit microscopic fiber particles that make garments sewn from spunbonded polyolefin unacceptable for industrial cleanroom applications. In addition, exposed seam edges and seam indentations tend to collect dust and other particulates that are undesirable for cleanroom applications or for hazardous dust protection applications. Unfortunately, it is very difficult to heat bond spunbonded polyolefin panels because the heat and pressure of a conventional heat bonding process reduces fiber orientation, which weakens the sheet material and makes the sheet material hard and brittle.

U.S. Pat. No. 4,938,817 discloses a method for ultrasonically bonding panels of TYVEK® spunbonded polyolefin directly to each other in the manner shown in FIGS. 1 and 2. In order to make a sufficiently strong seam according to the process of U.S. Pat. No. 4,938,817, two spunbonded polyolefin panels 10 and 12 are first placed on top of each other and lined up along a common edge 14, as shown in FIG. 1. Panels 10 and 12 are next ultrasonically bonded along a strip 16 near the edge 14 using a bonding pattern of short dashed lines 18. In order to make the seam sufficiently strong, sheet 10 must be subsequently folded over on itself, as shown in FIG. 2, and ultrasonically bonded against the previously bonded strip 16 using the same dashed line bonding pattern.

Although the seam formed as shown in FIGS. 1 and 2 is strong, the requirement that each seam be ultrasonically bonded two times makes seaming protective garments by this method time consuming and expensive. Accordingly, there is a need for an alternative method for effectively joining panels of spunbonded polyolefin sheet material that does not require bonding each seam two times to achieve sufficient strength, but also does not leave exposed panel edges.

SUMMARY OF THE INVENTION

This invention provides a method for ultrasonically joining first and second flashspun bonded polyolefin sheets and a seam generated by the method. The method includes the steps of forming an overlapped portion where a first sheet edge portion overlaps a second sheet edge portion and wherein a surface of the first sheet edge portion adjoins a surface of the second sheet edge portion, connecting the first and second sheet edge portions within the overlapped portion by ultrasonically welding the flashspun polyolefin sheet of the first sheet edge portion directly to the flashspun polyolefin sheet of the second sheet edge portion, such that the connected first and second sheet edge portions have a tensile strength across the overlapped and welded portion that is at least 75% of the tensile strength of the first and second sheet edge portions. The step of ultrasonically welding the polyolefin sheet of the first sheet edge portion to the polyolefin sheet of the second sheet edge portion within the overlapped portion includes the step of feeding the overlapped portion between a rotating ultrasonic horn and a patterned backup roll, in which the backup roll has on its surface a raised pattern of spaced and intersecting lines that produce a continuous composite barrier along the length of the overlapped first and second edge portions. During the step of ultrasonically welding the first and second edge portions, the edge of the ultrasonic welding horn is spaced from the top portions of the raised surface on the backup patterned roll by a distance that is no greater than the combined thicknesses of the first and second edge portions being joined together. The step of connecting the first and second sheet edge portions is accomplished with just one pass between the rotating ultrasonic horn and the patterned backup roll.

BRIEF DESCRIPTION OF THE DRAWINGS

The accompanying drawings, which are incorporated in and constitute a part of this specification, illustrate the presently preferred embodiment of the invention and, together with the description, serve to explain the principles of the invention.

DETAILED DESCRIPTION OF THE PREFERRED EMBODIMENT

Figure 3:
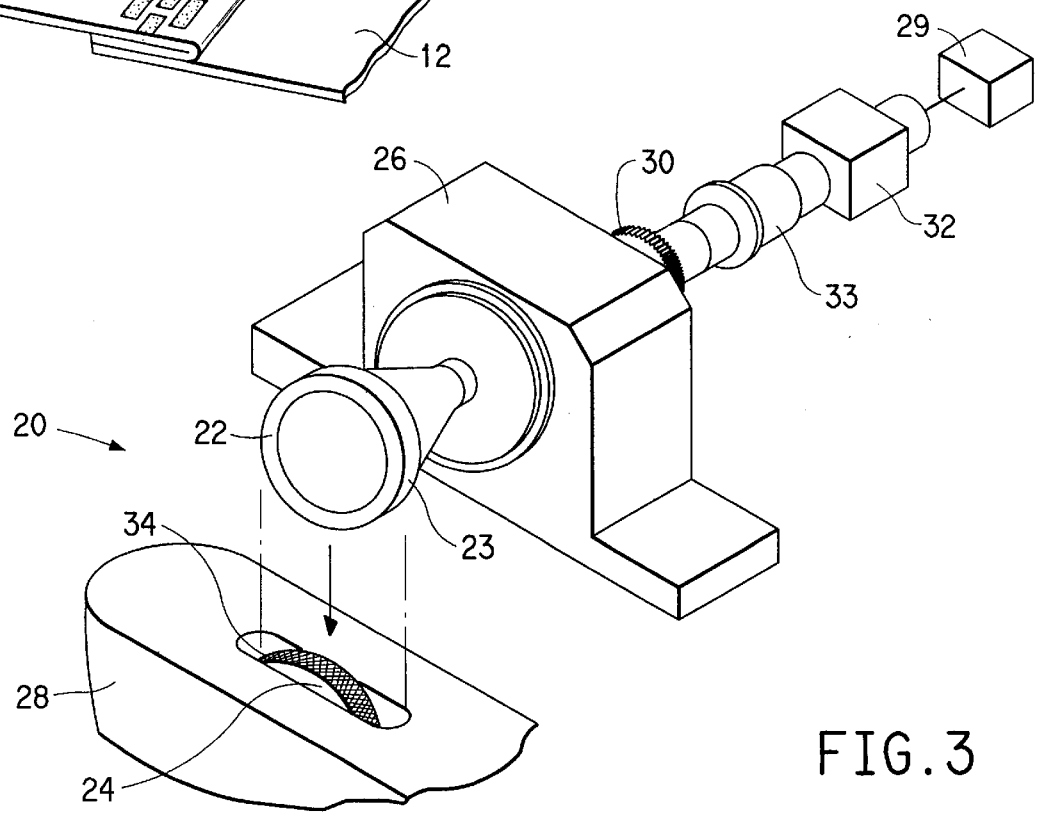
FIG. 3 is a perspective schematic representation of an ultrasonic bonding device used to seam spunbonded polyolefin sheets according to method of the invention.

Reference will now be made in detail to a preferred embodiment of the invention, examples of which are illustrated below. FIG. 3 shows an ultrasonic bonding device 20 that is used for joining sheets of spunbonded polyolefin sheet material in the manner of the invention. Device 20 is preferably a conventional ultrasonic bonding device. Device 20 includes a converter 32 that changes high frequency electrical energy provided by a power supply 29 into high frequency mechanical vibratory energy. The vibratory energy produced by converter 32 is amplified by a booster 33 before passing to a sonotrode horn 22. The sonotrode horn 22 can rotate in the adjustable bracket 26 while mechanically vibrating at a desired ultrasonic amplitude. Ultrasonic vibration in the horn 22 is emitted in a radial direction through the edge 23 of horn 22 to an object pressed against edge 23.

A patterned roll 24 is rotatably mounted on an arm 28 directly under edge 23 of sonotrode horn 22. Patterned roll 24 preferably has a raised pattern that corresponds to a desired bonding pattern, such as the diagonal pattern of raised lines 34 shown in FIG. 3. The surface of patterned roll 24 is made of a rigid material that does not readily conduct heat. The spacing between the horn edge 23 and the top of the raised portions of the patterned roll 24 should be set at slightly less than the thickness of two sheets to be bonded, as for example at about 200 microns if two layers of TYVEK® Style 1422A sheet material are to be bonded to each other. It is also preferred that the pressure on a sheet passing between sonotrode horn 22 and patterned roll 24 be about 10 kPa.

Mounting patterned roll 24 on an arm 28 is desirable if the ultrasonic bonding device is to be used to make seams in tubular structures such as the sleeves or legs of garments. Alternatively, patterned role 24 could be mounted on a flat work surface if flat panels of sheet material are to be joined. Means may be provided for mechanically rotating the sonotrode horn 22 and the patterned roll 24 in opposite directions so as to feed sheet material to be bonded into and out of the zone between horn 22 and roll 24. For example, a gear 30 could be driven by an electric motor (not shown) to rotate the horn 22. The patterned roll 24 could be mechanically rotated in a similar manner.

Spunbonded polyolefin sheets can be joined with the ultrasonically bonded seams of the invention using the ultrasonic bonding device 20. Such seams may be made as strong as the spunbonded polyolefin sheets joined with just one pass through bonding device 20 when the seaming method of the present invention is applied. The method of the invention will be described in terms of joining two sheets of spunbonded polyolefin sheet material, but it is anticipated that the invention could be equally applied to the joining of two edges of the same sheet of material, as for example in the seaming of the arms and legs of garments.

Figure 5:
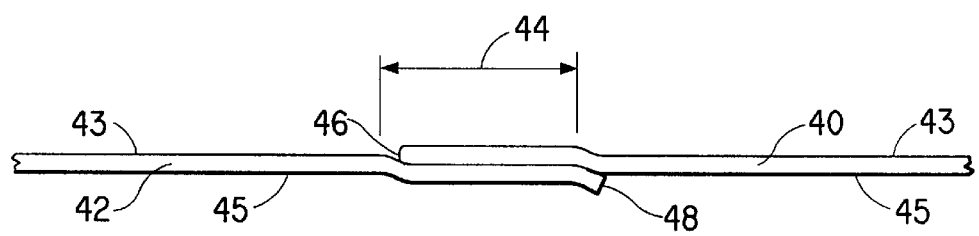
FIG. 5 is a cross-sectional view of two spunbonded polyolefin sheets joined along a seam made in accordance with the invention.

According to the method of the invention, portions along the two edges of sheets of spunbonded polyolefin sheet material to be joined are first overlapped as shown in FIG. 5. The overlapping portion should be approximately 5 to 10 mm wide. The overlapping portion is next passed between the edge 23 of sonotrode horn 22 and patterned roll 24. The area where the pattern on roll 24 presses the sheets being bonded against horn 22 is referred to as the ultrasonic bonding zone. The ultrasonic energy causes the molecules in the portions of the sheet that are pressed against the horn to vibrate and heat up due to friction between the molecules. The speed at which the polyolefin sheet material is passed through the ultrasonic bonding zone and the amplitude of the ultrasonic vibrational energy applied to the sheet are selected so as to momentarily melt the layers of sheet material together in the area where the raised pattern on roll 24 presses the sheet material against vibrating horn edge 23.

Figure 6:
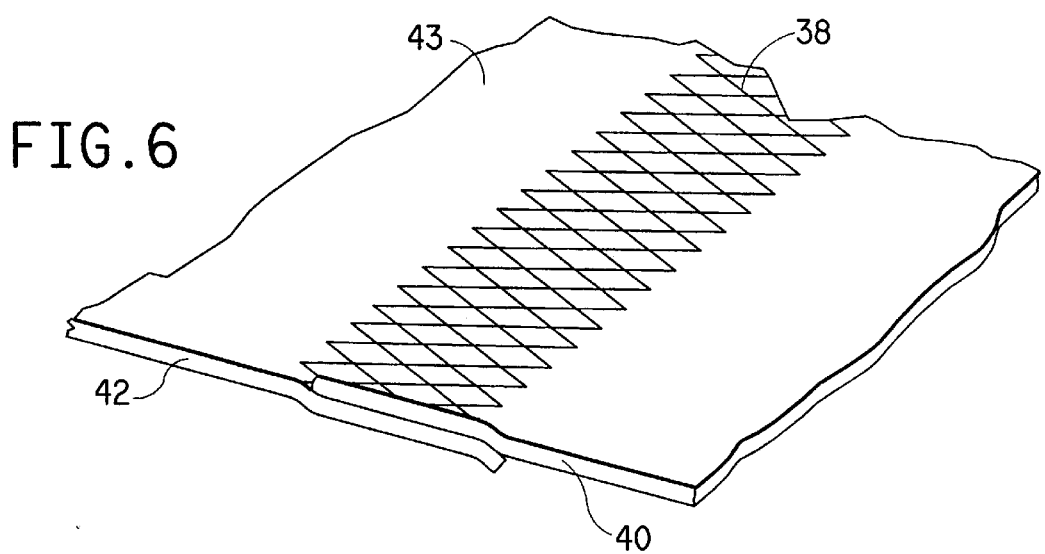
FIG. 6 is a perspective view of two spunbonded polyolefin sheets joined along a seam made in accordance with the invention.

When overlapping layers of sheet material pass through the ultrasonic bonding zone, an ultrasonically generated bonded strip with a cross-sectional dimension 44, as shown in FIG. 5, of about 6 to 8 mm is generated. The bonded strip covers most of the area where sheets 40 and 42 overlap along the length of the seam being generated. According to the invention, the bonded strip is made to extend past and bond over the edge 46 on the outwardly facing surface 43 of the sheets joined, as can be seen in FIG. 6. Bonding over the edge 46 eliminates outwardly facing free sheet edges that could be a source of contamination in certain protective garment applications.

Figure 1:
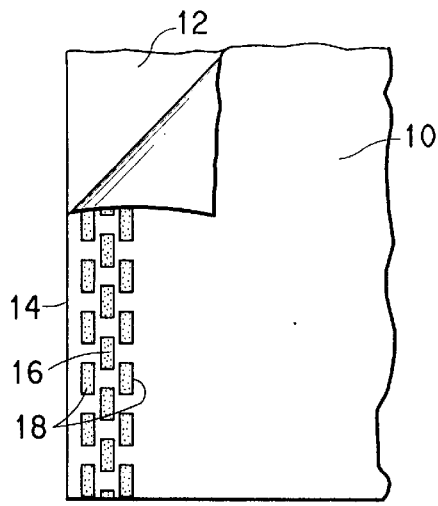
FIG. 1 is a plan view of a section of two sheets that are partially bonded to each other according to the process of the prior art.
Figure 2:
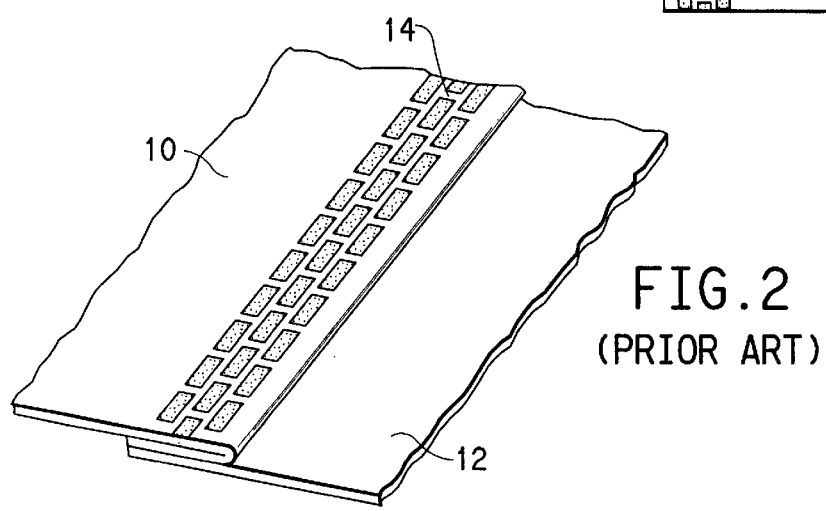
FIG. 2 is a perspective view of a section of two sheets that are bonded to each other according to the process of the prior art.
Figure 4:
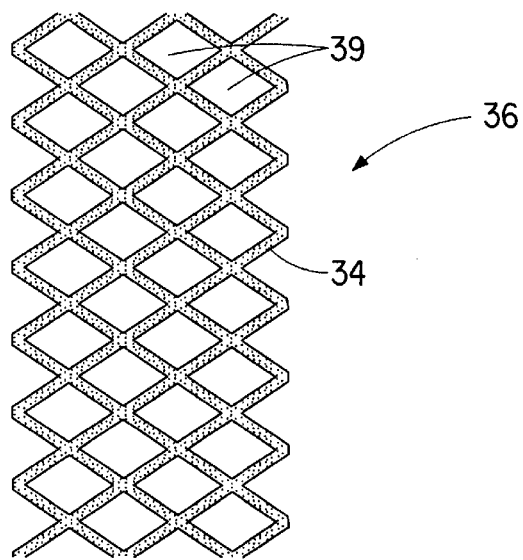
FIG. 4 is a plan view of a bonding pattern used in a preferred embodiment of the invention.

A preferred bonding pattern for the seam and seaming method of the invention is shown in FIG. 4. The waffle-like bonding pattern shown in FIG. 4 has a number of advantages for bonding spunbonded polyolefin sheet materials. First, the waffle pattern forms an impermeable barrier. Particulates, liquids, or microbes are blocked from passing through the seam by multiple bonded lines 34. For example, a liquid passing through a seam made with the bonding pattern shown in FIG. 4 would have to pass through five bonded lines in order to get through the seam. Thus, even if one of the bonded lines has a discontinuity, the other four bonded lines would still prevent passage of contaminates. Preferably, the hydrostatic head of the connected first and second sheet edge portions, including the overlapped portion, is at least 40 cm. Second, the seam bonded with the waffle-like bonding pattern shown in FIG. 4 remains soft and flexible because bonded lines 34 are interspersed with unbonded areas 39. Preferably, each of the bonded lines 34 is between 0.3 and 0.5 mm in width and the total area of the unbonded areas 39 is more than twice the area covered by the bonded lines 34. Third, the bonding pattern shown in FIG. 4 results in a very strong seam because the unbonded areas 39 of spunbonded polyolefin retain their full strength which, in turn, helps maintain the overall strength of the bonded strip. In addition, the bonded lines tend to spread seam stresses rather than concentrate stresses as is the case with a pattern of bonding points or dashes, like the prior art bonding pattern of FIGS. 1 and 2.

In order to join panels of spunbonded polyolefin sheet material with the overlap seam described above, and for the seam to have a tensile strength as great as the sheet material, the amplitude of the ultrasonic vibrations applied during bonding must be adjusted for each speed at which the sheet material travels through the ultrasonic bonding zone. At a given sheet travel speed, bonding will be incomplete if the amplitude of the ultrasonic vibrations is too low, and the sheet material will be made weak and brittle if the amplitude of the ultrasonic vibrations is too high. As the travel speed of the sheet through the ultrasonic bonding zone increases, the ultrasonic amplitudes at which bonding best occurs also go up. This is because a shorter period of time in the ultrasonic bonding zone means that energy must be transferred to the sheet at a higher rate to achieve optimum bonding. The optimum ultrasonic amplitude for a given sheet travel speed is dependent on the type of sheet material being bonded. The optimum ultrasonic bonding amplitudes for bonding TYVEK® Style 1422A sheets will be apparent from the nonlimiting examples that follow.

EXAMPLES

In the description above and in the non-limiting examples that follow, the following test methods were employed to determine various reported characteristics and properties. ASTM refers to the American Society of Testing Materials. ISO refers to the International Standards Organization.

Basis weight was determined by ASTM D-3776, which is hereby incorporated by reference, and is reported in g/m².

Tensile strength was determined by ASTM D 1682, which is hereby incorporated by reference, and is reported in Newtons/inch. In this test a 1 inch by 8 inch sample is grabbed at opposite ends of the 8 inch sample length with the seam positioned near the center of the sample and oriented in a direction perpendicular to the longitudinal axis of the sample. The sample is pulled steadily until the sample breaks. The force at break is recorded as the breaking tensile strength.

Hydrostatic head was measured using ISO 811, which is hereby incorporated by reference. This test measures the resistance of a sheet to the penetration by liquid water under a static load. A 100 cm² sample is mounted in an SDL Shirley Hydrostatic Head Tester (manufactured by Shirley Developments Limited, Stockport, England). Water is pumped against one side of the sample until three points of leakage appear on the surface. The measured hydrostatic pressure is reported in centimeters of water.

EXAMPLES 1–4

In examples 1–4, panels of TYVEK® Style 1422A sheets, sold by DuPont, were ultrasonically bonded in the manner described above using an ultrasonic bonding device like that described above with reference to FIG. 3. TYVEK® Style 1422A sheets are made from flashspun polyethylene plexifilamentary fiber that have been thermally bonded. TYVEK® Style 1422A sheets have a basis weight of 42 g/m², a tensile strength of about 43N/inch in the machine direction and about 50N/inch in the cross direction, and have a hydrostatic head of 130 cm. TYVEK® Style 1422A sheets have a linen texture on one side and have a ribbed texture on the opposite side.

The ultrasonic bonding machine used in these examples was a Rotosonic Over the Arm ultrasonic welding machine made by CERA France of Villars, France. The bonding machine had a maximum ultrasonic amplitude of 20 kHz. The sheets were overlapped by approximately 6 to 8 mm and fed between a sonotrode horn and a patterned roll like that described above with reference to FIGS. 3 and 4, and with the pattern shown in FIG. 4. The sheets were bonded at a variety of sheet travel speeds with seams like the seam shown in FIGS. 5 and 6. In all cases, the ribbed sheet surface was bonded to the linen sheet surface. At each sheet travel speed, bonding was conducted over a range of ultrasonic frequencies. The tensile strength of a seamed sample produced under each set of test conditions is recorded in Table 1 below.

TABLE 1

| Example No. | Sheet Travel Speed (m/min) | Ultrasonic Amplitude (% of max) | Tensile Strength (N/inch) | Comments |
|---|---|---|---|---|
| 1a | 3.83 | 40 | 46 | |
| 1b | 3.83 | 50 | 49 | Good Seam |
| 1c | 3.83 | 60 | 42 | Seam brittle |
| 2a | 5.78 | 40 | 39 | Seam delaminates |
| 2b | 5.78 | 50 | 42 | Good Seam |
| 2c | 5.78 | 60 | 47 | Good Seam |
| 2d | 5.78 | 70 | 40 | Seam very brittle |
| 3a | 7.72 | 50 | 38 | Seam delaminates |
| 3b | 7.72 | 60 | 48 | Good Seam |

TABLE 1-continued

| Example No. | Sheet Travel Speed (m/min) | Ultrasonic Amplitude (% of max) | Tensile Strength (N/inch) | Comments |
|---|---|---|---|---|
| 3c | 7.72 | 70 | 53 | Good Seam |
| 3d | 7.72 | 80 | 41 | Seam very brittle |
| 4a | 11.60 | 50 | 42 | Seam delaminates |
| 4b | 11.60 | 70 | 52 | Good Seam |
| 4c | 11.60 | 80 | 45 | Good Seam |

EXAMPLE 5

TYVEK® Style 1422A sheets were ultrasonically bonded in the manner described above using an ultrasonic bonding device like that used in Examples 1–4. Three ultrasonically bonded configurations of the seam of the invention were tested for hydrostatic head. First, a straight seam like that shown in FIG. 6 was tested according to the method described above. Second, a "T" shaped juncture of two seams made according to the invention (connecting three pieces of sheet material) was tested for hydrostatic head. Third, a "cross" shaped seam juncture of two seams made according to the invention (connecting four pieces of sheet material) was tested for hydrostatic head. In each of the three seam arrangements, the hydrostatic head tested at approximately 50 cm.

For comparative purposes, two sheets of TYVEK® Style 1422A sheets were joined together by overlapping approximately 7 mm of the sheets and sewing them together in a conventional manner. The seam was tested for hydrostatic head using the method described above. The hydrostatic head for the sewn seam was approximately 10 cm.

It will be apparent to those skilled in the art that modifications and variations can be made in the ultrasonically generated seam and seaming method of this invention. The invention in its broader aspects is, therefore, not limited to the specific details or the illustrative examples described above. Thus, it is intended that all matter contained in the foregoing description, drawings and examples shall be interpreted as illustrative and not in a limiting sense.

We claim:

1. A seam joining edges of flashspun bonded polyolefin sheet material, comprising:

a first flashspun bonded polyolefin sheet edge portion having opposite first and second surfaces;

a second flashspun bonded polyolefin sheet edge portion having opposite first and second surfaces;

an overlapped portion formed where said first sheet edge portion directly overlaps said second sheet edge portion and wherein said second surface of said first sheet edge portion directly adjoins said first surface of said second sheet edge portion, said overlapped portion having a width of at least 3 mm and no more than about 20 mm and having a thickness no greater than the combined thicknesses of the first and second sheet edge portions, said first and second sheet edge portions being connected to each other within said overlapped portion only by ultrasonic welding of said flashspun polyolefin sheet of said first sheet edge portion directly to the flashspun polyolefin sheet of said second sheet edge portion where said first and second sheet edge portions adjoin;

wherein said connected first and second sheet edge portions have a tensile strength across said overlapped and welded portion that is at least 75% of the tensile strength of the first sheet edge portion and is at least 75% of the tensile strength of the second sheet edge portion.

2. The seam joining edges of flashspun bonded polyolefin sheet material of claim 1 wherein the tensile strength across said overlapped and welded portion is at least 40N/inch.

3. The seam joining edges of flashspun bonded polyolefin sheet material of claim 2 wherein the hydrostatic head of the connected first and second sheet edge portions, including the overlapped portion, is at least 40 cm.

4. The seam joining edges of flashspun bonded polyolefin sheet material of claim 1 wherein the polyolefin sheet of said first sheet edge portion is welded to the polyolefin sheet of said second sheet edge portion within the overlapped portion in a pattern of spaced and intersecting lines that together form a continuous bonded barrier that extends the length of the joined edges.

5. The seam joining edges of flashspun bonded polyolefin sheet material of claim 4 wherein the welding pattern extends to the edge of said first edge portion.

6. A garment made from panels of flashspun polyolefin sheet material wherein the panels are joined together with the seam of claim 1.

* * * * *